United States Patent [19]
Shoji et al.

[11] Patent Number: 5,650,244
[45] Date of Patent: Jul. 22, 1997

[54] NONAQUEOUS ELECTROLYTE BATTERY COMPRISING A NON-AQUEOUS ELECTROLYTE WITH AT LEAST ONE CALCIUM SALT

[75] Inventors: Yoshihiro Shoji, Osaka; Mayumi Uehara, Kyoto; Koji Nishio, Osaka; Toshihiko Saito, Hyogo, all of Japan

[73] Assignee: Sanyo Electric Co., Ltd., Osaka, Japan

[21] Appl. No.: 519,519

[22] Filed: Aug. 25, 1995

[30] Foreign Application Priority Data

Aug. 25, 1994 [JP] Japan .................... 6-225924

[51] Int. Cl.$^6$ .................................... H01M 6/14
[52] U.S. Cl. ................ 429/194; 429/197; 429/198
[58] Field of Search .................... 429/194, 196, 429/197, 198

[56] References Cited

U.S. PATENT DOCUMENTS 4,142,028  2/1979  Leger et al. .................... 429/194
4,264,689  4/1981  Moses ............................ 429/194
4,844,996  7/1989  Peled et al. .................... 429/194

FOREIGN PATENT DOCUMENTS 55-119362  9/1980  Japan .

*Primary Examiner*—Stephen Kalafut
*Assistant Examiner*—Jonathan S. Krueger
*Attorney, Agent, or Firm*—Birch, Stewart, Kolasch & Birch, LLP

[57] ABSTRACT

A nonaqueous electrolyte battery comprises a positive electrode, a negative electrode with lithium as active material, a nonaqueous electrolyte comprising a solute and a solvent, and a separator, the nonaqueous electrolyte further comprising $3 \times 10^{-4}$ to $3 \times 10^{-2}$ mole/liter, preferably $1.5 \times 10^{-3}$ to $6 \times 10^{-3}$ mole/liter of a specific calcium salt. This battery, with the nonaqueous electrolyte incorporating the specific calcium in the specific amount, causes little self-discharge during storage, thus having excellent storage stability.

8 Claims, 2 Drawing Sheets

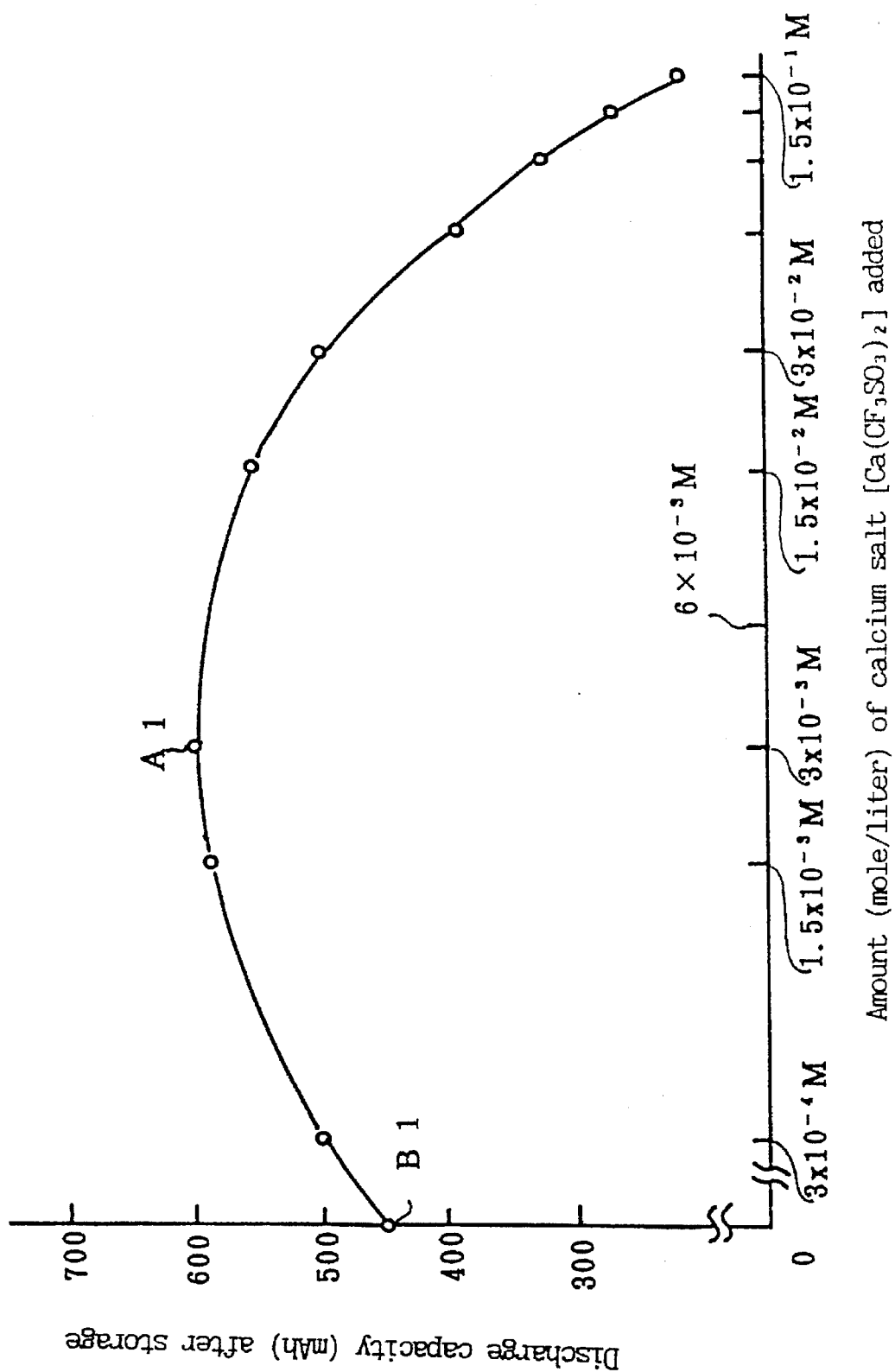

NONAQUEOUS ELECTROLYTE BATTERY COMPRISING A NON-AQUEOUS ELECTROLYTE WITH AT LEAST ONE CALCIUM SALT

BACKGROUND OF THE INVENTION

1. Field of the Invention

The present invention relates to a nonaqueous electrolyte battery and, more specifically, to improvement of nonaqueous electrolytes in order to obtain a nonaqueous electrolyte battery having excellent storage stability.

2. Description of the Prior Art

In recent years, much attention has been paid to batteries utilizing lithium as a negative electrode active material, since they have a high energy density and can provide high voltages.

Since lithium is extremely reactive with water, batteries of this type use nonaqueous electrolytes. For such electrolytes, there are used solvents such as ethylene carbonate, propylene carbonate, butylene carbonate, vinylene carbonate, 1,2-dimethoxyethane, dimethyl carbonate, diethyl carbonate, ethylmethyl carbonate, tetrahydrofuran, 1,3-dioxolane and mixtures of the foregoing; and solutes such as $LiPF_6$, $LiCF_3SO_3$, $LiClO_4$, $LiBF_4$, $LiN(CF_3SO_2)_2$ and $LiAsF_6$.

Conventional nonaqueous electrolyte batteries, however, have the problem of their capacity decreasing during storage thereof, caused by decomposition of the nonaqueous electrolyte by reaction with the negative electrode. In particular, with use of a carbon material such as graphite or coke as the negative electrode material, the battery capacity decreases to a large extent after the battery has been charged and stored. Accordingly, the above problem of self-discharge has been a particularly serious problem with nonaqueous electrolyte batteries using a carbon material as the negative electrode material.

As a result of an intensive study to solve the problem, the present inventors have found that addition of a specified amount of a specific material to the nonaqueous electrolyte suppresses the reaction (self-discharge) of the electrolyte with the negative electrode, thereby improving the storage stability.

SUMMARY OF THE INVENTION

Accordingly, an object of the present invention is to provide a nonaqueous electrolyte battery having excellent storage stability.

The present invention provides a nonaqueous electrolyte battery comprising a positive electrode, a negative electrode with lithium as the active material, a nonaqueous electrolyte comprising a solute and a solvent, and a separator, said nonaqueous electrolyte further comprising $3 \times 10^{-4}$ to $3 \times 10^{-2}$ mole/liter of at least one calcium salt selected from the group consisting of $Ca(CF_3SO_3)_2$, $Ca(BF_4)_2$, $Ca(PF_6)_2$, $Ca\{N(CF_3SO_2)_2\}_2$, $Ca(ClO_4)_2$, $Ca(AlCl_4)_2$, $Ca(CF_3COO)_2$, $Ca\{P(CF_3SO_2)_2\}_2$, $CaMe^1(CF_3SO_3)_3$, $CaMe^1(BF_4)_3$, $CaMe^1(PF_6)_3$, $CaMe^1\{N(CF_3SO_2)_2\}_3$, $CaMe^1(ClO_4)_3$, $CaMe^1(AlCl_4)_3$, $CaMe^1(CF_3COO)_3$, $CaMe^1\{P(CF_3SO_2)_2\}_3$, $CaMe^1Me^2(CF_3SO_3)_5$, $CaMe^1Me^2(BF_4)_5$, $CaMe^1Me^2(PF_6)_5$, $CaMe^1Me^2\{N(CF_3SO_2)_2\}_5$, $CaMe^1Me^2(ClO_4)_5$, $CaMe^1Me^2(AlCl_4)_5$, $CaMe^1Me^2(CF_3COO)_5$, $CaMe^1Me^2\{P(CF_3SO_2)_2\}_5$ and derivatives of the foregoing, wherein $Me^1$ represents Li, Na, K, Rb, Cs or Fr and $Me^2$ represents Be, Mg, Sr, Ba or Ra. For the $Me^1$, Li is preferred, and Mg for the $Me^2$.

BRIEF DESCRIPTION OF THE DRAWINGS

A more complete appreciation of the invention and many of the attendant advantages thereof will be readily obtained as the same is better understood by reference to the following detailed description when considered in connection with the accompanying drawings, wherein:

FIG. 2 is a graph showing the relationship between the amount of $Ca(CF_3SO_3)_2$ added to the nonaqueous electrolyte and the discharge capacity after storage in the charged state.

DETAILED DESCRIPTION OF THE PREFERRED EMBODIMENTS

Figure 1:
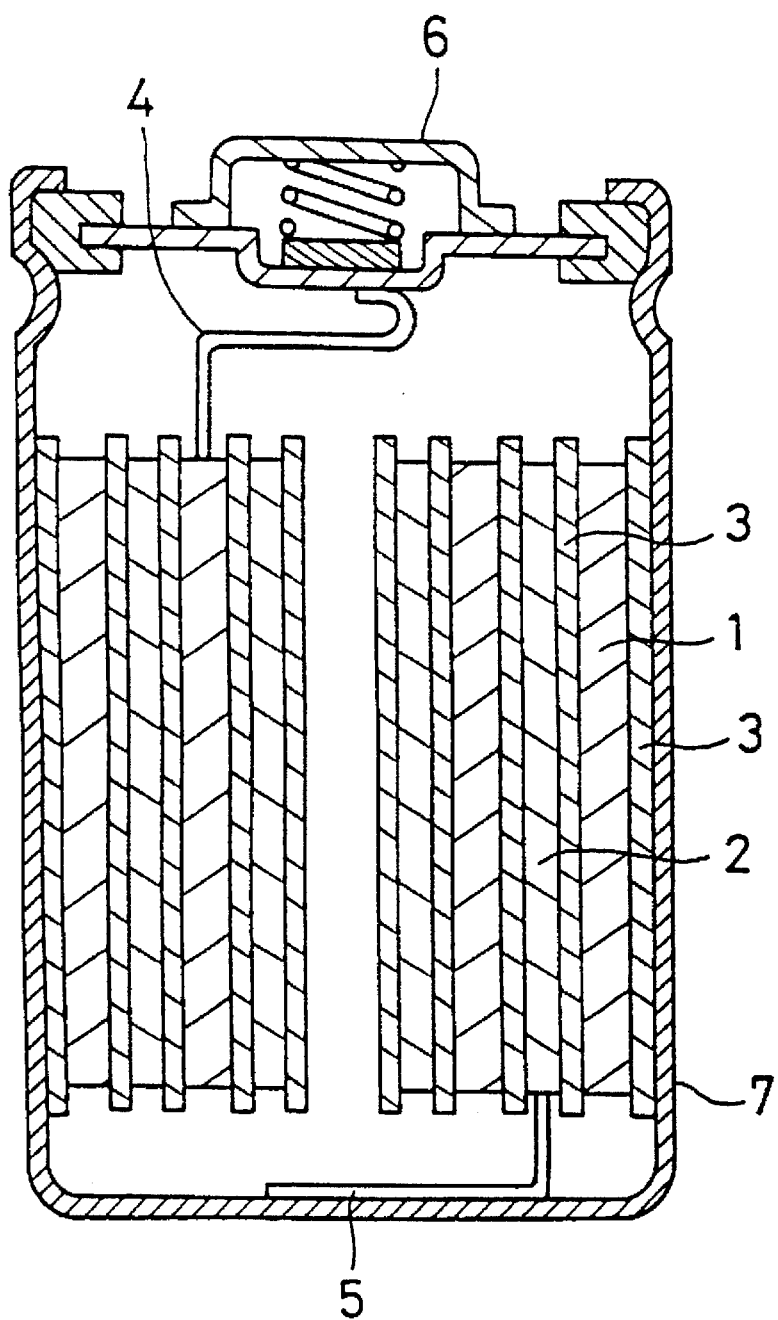
FIG. 1 is a cross-sectional view of the cylindrical nonaqueous electrolyte battery (of the present invention) prepared in Examples.

The above calcium salt should be added in an amount of $3 \times 10^{-4}$ to $3 \times 10^{-2}$ mole/liter. Too small an amount added of less than $3 \times 10^{-4}$ mole/liter cannot give a nonaqueous electrolyte battery having excellent storage stability. On the other hand, with the addition exceeding $3 \times 10^{-2}$ mole/liter, the calcium salt deposits on the surface of the electrode and badly affects it, thereby providing poor storage stability. The amount of the calcium salt added is preferably in a range of $1.5 \times 10^{-3}$ to $6 \times 10^{-3}$ mole/liter. The above calcium salts may be used singly or, as necessary, in combination of two or more.

Examples of the derivatives of the above calcium salts are halogenated or hydrogenated ones obtained by replacing the halogen atoms contained in the calcium salts by other halogen atoms or hydrogen. Specific examples of the derivatives of $Ca(CF_3SO_3)_2$ are $Ca(CCl_3SO_3)_2$ and $Ca(CH_3SO_3)_2$, those of $Ca\{N(CF_3SO_2)_2\}_2$ are $Ca\{N(CCl_3SO_2)_2\}_2$ and $Ca\{N(CH_3SO_2)_2\}_2$, that of $Ca(BF_4)_2$ is $Ca(BCl_4)_2$, that of $Ca(PF_6)_2$ is $Ca(PCl_6)_2$ and those of $Ca(CF_3COO)_2$ are $Ca(CCl_3COO)_2$ and $Ca(CH_3COO)_2$.

It is desirable to add, together with the calcium salt, N-methyl-2-pyrrolidone (NMP) to increase the solubility of the calcium salt in the nonaqueous electrolyte used. In this case, N-methyl-2-pyrrolidone is added preferably in an amount of 10 to 1,000 ml per mole of the calcium salt.

Examples of the negative electrode with lithium as the active material are those using as the electrode material a substance capable of absorbing and discharging lithium ions, or lithium metal. Examples of the substance capable of absorbing and discharging lithium ions are lithium alloys, e.g. Li—Al alloys, Li—Sn alloys, Li—Pb alloys; metal oxides, e.g. $Fe_2O_3$, $Nb_2O_3$ and $WO_3$ and carbon materials, e.g. graphite and coke.

The key feature of the present invention lies in the addition of the above specific calcium salts in order to suppress the decomposition (self-discharge) of the nonaqueous electrolyte at the negative electrode which uses lithium as the active material. The materials of components constituting the battery, other than the negative electrode material and nonaqueous electrolyte, are therefore not specifically limited.

Examples of the positive electrode material used in the invention are those metal oxides and metal sulfides that contain at least one transition metal selected from the group consisting of manganese, cobalt, nickel, vanadium, iron and niobium. Specific examples thereof are $MnO_2$, $LiMnO_2$, $LiMn_2O_4$, $LiCoO_2$, $LiNiO_2$, $Li_2CoNiO_4$, $LiV_2O_5$, $LiVO_2$, $LiFeO_2$, $LiNb_2O_5$ and $LiNbO_2$.

Known separators for nonaqueous electrolyte batteries can also be used for the batteries of the present invention.

Specific examples of usable separators are porous polypropylene and polyamide films having ion permeability.

Self-discharge is markedly suppressed with the batteries of the present invention, which have a nonaqueous electrolyte incorporating a specific calcium salt, since the calcium ion formed by dissociation of the calcium salt in the nonaqueous electrolyte surrounds the surface of the electrode and hinders the nonaqueous electrolyte from contacting with the negative electrode and decomposing.

EXAMPLES

Other features of the invention will become more apparent in the course of the following detailed descriptions of exemplary embodiments which are given for illustration of the invention and are not intended to be limiting thereof.

Example 1

Preparation of positive electrode

A slurry was prepared by mixing 85 parts by weight of a positive electrode active material of $LiCoO_2$, 10 parts by weight of a conductive agent of carbon powder, 5 parts by weight of a binder of a fluororesin powder and a small amount of water. The slurry was applied on both sides of a positive electrode collector of aluminum foil, and then the foil with the slurry was heat treated at a temperature of 150° C. to give a positive electrode.

Preparation of negative electrode

A slurry was prepared by mixing 85 parts by weight of graphite powder, 15 parts by weight of a binder of a fluororesin powder and a small amount of water. The slurry was applied on both sides of a negative electrode collector of copper foil, and then the foil with the slurry was heat treated at a temperature of 150° C. to give a negative electrode.

Preparation of electrolyte

A nonaqueous electrolyte was prepared by dissolving, in a 1/1 by volume mixed solvent of ethylene carbonate (EC) and 1,2-dimethoxyethane (DME), 1 mole/liter of a solute of lithium hexafluorophosphate ($LiPF_6$) and $3\times10^{-3}$ mole/liter of $Ca(CF_3SO_3)_2$ as calcium salt.

Preparation of battery

A cylindrical battery A1 according to the present invention was prepared (battery size: 13.8 mm diameter, 48.9 mm height). A microporous polypropylene film having ion permeability was used as separator, which was then impregnated with the above nonaqueous electrolyte.

FIG. 1 is a schematic cross-sectional view of the battery A1 prepared according to the present invention. The battery A1 shown in the FIGURE consists of a positive electrode 1, a negative electrode 2, a separator 3 separating the two electrodes, a positive electrode lead 4, a negative electrode lead 5, a positive electrode outside terminal 6, a negative electrode can 7 and other parts. The positive and negative electrodes 1 and 2 are, while being spirally wound via the separator 3 into which the nonaqueous electrolyte has been injected, housed in the negative electrode can 7. The positive electrode 1 is connected, via the positive electrode lead 4, to the positive electrode outside terminal 6 and the negative electrode 2 to the negative electrode can 7 via the negative electrode lead 5, so that chemical energy generated inside the battery can be taken out as electric energy.

Example 2

Example 1 was repeated except that $Ca(BF_4)_2$ was, instead of $Ca(CF_3SO_3)_2$, added to the nonaqueous electrolyte in an amount of $5\times10^{-3}$ mole/liter in the electrolyte preparation, to prepare a battery A2 according to the present invention.

Example 3

Example 1 was repeated except that $Ca(PF_6)_2$ was, instead of $Ca(CF_3SO_3)_2$, added to the nonaqueous electrolyte in an amount of $3\times10^{-3}$ mole/liter in the electrolyte preparation, to prepare a battery A3 according to the present invention.

Example 4

Example 1 was repeated except that $Ca\{N(CF_3SO_2)_2\}_2$ was, instead of $Ca(CF_3SO_3)_2$, added to the nonaqueous electrolyte in an amount of $2\times10^{-3}$ mole/liter in the electrolyte preparation, to prepare a battery A4 according to the present invention.

Example 5

Example 1 was repeated except that $Ca(ClO_4)_2$ was, instead of $Ca(CF_3SO_3)_2$, added to the nonaqueous electrolyte in an amount of $4\times10^{-3}$ mole/liter in the electrolyte preparation, to prepare a battery A5 according to the present invention.

Example 6

Example 1 was repeated except that $Ca(AlClO_4)_2$ was, instead of $Ca(CF_3SO_3)_2$, added to the nonaqueous electrolyte in an amount of $3\times10^{-3}$ mole/liter in the electrolyte preparation, to prepare a battery A6 according to the present invention.

Example 7

Example 1 was repeated except that $Ca(CF_3COO)_2$ was, instead of $Ca(CF_3SO_3)_2$, added to the nonaqueous electrolyte in an amount of $4\times10^{-3}$ mole/liter in the electrolyte preparation, to prepare a battery A7 according to the present invention.

Example 8

Example 1 was repeated except that as solvent for the nonaqueous electrolyte a 1/1 by volume mixed solvent of propylene carbonate (PC) and 1,2-dimethoxyethane was used, instead of the 1/1 by volume of mixed solvent of ethylene carbonate and 1,2-dimethoxyethane, to prepare a battery A8 according to the present invention.

Example 9

Example 1 was repeated except that $Ca(CF_3SO_3)_2$ and $Ca(BF_4)_2$ were, instead of $Ca(CF_3SO_3)_2$, added to the nonaqueous electrolyte in amounts of $1.5\times10^{-3}$ mole/liter and $1.5\times10^{-3}$ mole/liter respectively in the electrolyte preparation, to prepare a battery A9 according to the present invention.

Example 10

Example 1 was repeated except that $Ca(PF_6)_2$ and $Ca\{N(CF_3SO_2)_2\}_2$ were, instead of $Ca(CF_3SO_3)_2$, added to the nonaqueous electrolyte in amounts of $1.5\times10^{-3}$ mole/liter and $1.5\times10^{-3}$ mole/liter respectively in the electrolyte preparation, to prepare a battery A10 according to the present invention.

Examples 11 through 20

Examples 1 through 11 were repeated except that, in preparing the electrolytes, N-methyl-2-pyrrolidone was, after addition of the corresponding calcium salts, further added in an amount of 100 ml per mole of each of the salts, to prepare batteries A11 through A20 according to the present invention in this order.

Examples 21 through 37

Example 1 was repeated except that each of calcium salts as shown in Table 2 was, instead of $Ca(CF_3SO_3)_2$, added to the nonaqueous electrolyte in an amount of $3 \times 10^{-3}$ mole/liter in the electrolyte preparation, to prepare batteries A21 through A37 according to the present invention.

Examples 38 through 54

Examples 21 through 37 were repeated except that, after addition of each of the calcium salts shown in Table 2, N-methyl-2-pyrrolidone was further added in an amount of 100 ml per mole of each salt, to prepare batteries A38 through A54 according to the present invention in this order.

Comparative Example 1

Example 1 was repeated except that no calcium salt was added to the nonaqueous electrolyte in the electrolyte preparation, to prepare a comparison battery B1.

Comparative Example 2

Comparative Example 1 was repeated except that as solvent for the nonaqueous electrolyte a 1/1 by volume mixed solvent of propylene carbonate and 1,2-dimethoxyethane was used instead of the 1/1 by volume of mixed solvent of ethylene carbonate and 1,2-dimethoxyethane, to prepare a comparison battery B2.

Storability of each battery

The batteries A1 through A54 according to the present invention and comparison batteries B1 and B2 were tested for self-discharge rate, which was taken an index of storage stability, as follows.

Discharge capacity before storage

Each of the batteries just after preparation was charged at a charge current of 200 mA to a voltage of 4.1 V and then discharged at 200 mA to 2.75 V, to give the discharge capacity before storage, which was found to be 650 mAh in all cases.

Discharge capacity after storage

Each of the batteries was, just after preparation in the same manner as above, charged at a charge current of 200 mA to 4.1 V. The batteries thus charged were stored at 60° C. for 2 months and then discharged at 200 mA to 2.75 V, to give the discharge capacity after storage.

Since the storage at 60° C. for 2 months corresponds to storage for 3 years at room temperature, the self-discharge rate at room temperature per year was calculated with the following formula. The self-discharge rates thus obtained of the batteries are shown in Tables 1 and 2.

Self-discharge rate (%/year)={(discharge capacity immediately after preparation–discharge capacity after storage)/discharge capacity immediately after preparation}÷3×100

TABLE 1

| Battery | Calcium salt | NMP | Self-discharge rate (%/year) |
|---|---|---|---|
| Battery of the invention | | | |
| A1 | $Ca(CF_3SO_3)_2$ | not added | 3.1 |
| A2 | $Ca(BF_4)_2$ | not added | 4.0 |
| A3 | $Ca(PF_6)_2$ | not added | 3.3 |
| A4 | $Ca\{N(CF_3SO_2)_2\}_2$ | not added | 3.5 |
| A5 | $Ca(ClO_4)_2$ | not added | 3.5 |
| A6 | $Ca(AlCl_4)_2$ | not added | 3.4 |
| A7 | $Ca(CF_3COO)_2$ | not added | 3.5 |
| A8 | $Ca(CF_3SO_3)_2$ | not added | 3.2 |
| A9 | $Ca(CF_3SO_3)_2 + Ca(BF_4)_2$ | not added | 3.5 |
| A10 | $Ca(PF_4)_2 + Ca\{N(CF_3SO_2)_2\}_2$ | not added | 3.4 |
| A11 | $Ca(CF_3SO_3)_2$ | added | 2.4 |
| A12 | $Ca(BF_4)_2$ | added | 3.5 |
| A13 | $Ca(PF_4)_2$ | added | 2.7 |
| A14 | $Ca\{N(CF_3SO_2)_2\}_2$ | added | 3.0 |
| A15 | $Ca(ClO_4)_2$ | added | 2.9 |
| A16 | $Ca(AlCl_4)_2$ | added | 2.8 |
| A17 | $Ca(CF_3COO)_2$ | added | 2.9 |
| A18 | $Ca(CF_3SO_3)_2$ | added | 2.5 |
| A19 | $Ca(CF_3SO_3)_2 + Ca(BF_4)_2$ | added | 3.0 |
| A20 | $Ca(PF_4)_2 + Ca\{N(CF_3SO_2)_2\}_2$ | added | 2.8 |

TABLE 2

| Battery | Calcium salt | NMP | Self-discharge rate (%/year) |
|---|---|---|---|
| Battery of the invention | | | |
| A21 | $Ca\{P(CF_3SO_2)_2\}_2$ | not added | 3.7 |
| A22 | $CaLi(CF_3SO_3)_3$ | not added | 3.6 |
| A23 | $CaLi(BF_4)_3$ | not added | 3.7 |
| A24 | $CaLi(PF_6)_3$ | not added | 3.9 |
| A25 | $CaLiN(CF_3SO_2)_2\}_3$ | not added | 3.7 |
| A26 | $CaLi(ClO_4)_3$ | not added | 3.8 |
| A27 | $CaLi(AlCl_4)_3$ | not added | 3.8 |
| A28 | $CaLi(CF_3COO)_3$ | not added | 4.0 |
| A29 | $CaLi\{P(CF_3SO_2)_2\}_3$ | not added | 3.7 |
| A30 | $CaLiMg(CF_3SO_3)_5$ | not added | 3.9 |
| A31 | $CaLiMg(BF_4)_5$ | not added | 3.6 |
| A32 | $CaLiMg(PF_4)_6$ | not added | 3.5 |
| A33 | $CaLiMg\{N(CF_3SO_2)_2\}_5$ | not added | 3.6 |
| A34 | $CaLiMg(ClO_4)_5$ | not added | 3.8 |
| A35 | $CaLiMg(AlCl_4)_5$ | not added | 3.9 |
| A36 | $CaLiMg(CF_3COO)_5$ | not added | 3.8 |
| A37 | $CaLiMg\{P(CF_3SO_2)_2\}_5$ | not added | 3.7 |
| A38 | $Ca\{P(CF_3SO_2)_2\}_2$ | added | 3.0 |
| A39 | $CaLi(CF_3SO_3)_3$ | added | 2.9 |
| A40 | $CaLi(BF_4)_3$ | added | 3.1 |
| A41 | $CaLi(PF_6)_3$ | added | 3.2 |
| A42 | $CaLi\{N(CF_3SO_2)_2\}_5$ | added | 3.2 |
| A43 | $CaLi(ClO_4)_3$ | added | 3.3 |
| A44 | $CaLi(AlCl_4)_3$ | added | 3.3 |
| A45 | $CaLi(CF_3COO)_3$ | added | 3.4 |
| A46 | $CaLi\{P(CF_3SO_2)_2\}_3$ | added | 3.1 |
| A47 | $CaLiMg(CF_3SO_3)_5$ | added | 3.2 |
| A48 | $CaLiMg(BF_4)_5$ | added | 2.9 |
| A49 | $CaLiMg(PF_4)_2$ | added | 2.9 |
| A50 | $CaLiMg\{N(CF_3SO_2)_2\}_5$ | added | 3.0 |
| A51 | $CaLiMg(ClO_4)_5$ | added | 3.2 |
| A52 | $CaLiMg(AlCl_4)_5$ | added | 3.4 |

TABLE 2-continued

| Battery | Calcium salt | NMP | Self-discharge rate (%/year) |
|---|---|---|---|
| A53 | CaLiMg(CF$_3$COO)$_5$ | added | 3.3 |
| A54 Comparison battery | CaLiMg{P(CF$_3$SO$_2$)$_2$}$_5$ | added | 3.1 |
| B1 | not added | not added | 10.1 |
| B2 | not added | not added | 10.6 |

As seen from Tables 1 and 2, the batteries A1 through A54 according to the present invention, with the nonaqueous electrolyte incorporating specific calcium salts have lower self-discharge rates, thus having better storage stability, as compared with the comparison batteries B1 and B2 with the nonaqueous electrolyte incorporating no calcium salt. As further understood from Tables 1 and 2, among the batteries A1 through A54 according to the present invention, those A11 through A20 and A38 through A54, with the nonaqueous electrolyte incorporating N-methyl-2-pyrrolidone in addition to the calcium salts have particularly good storage stability.

Separately, Example 1 was repeated except that, in the electrolyte preparation, 3×10$^{-3}$ mole/liter of CaCO$_3$, CaSO$_4$, Ca(NO$_3$)$_2$, CaCl$_2$, CaF$_2$, CaBr$_2$ or CaI$_2$ was, instead of Ca(CF$_3$SO$_3$)$_2$, added to the nonaqueous electrolyte, to prepare various nonaqueous electrolyte batteries. These batteries were, in the same manner as above, tested for self-discharge rate. Then, it was found that they all had the same self-discharge rate (10.1%) as that of the comparison battery B1. This fact shows that the effect of improving the storage stability can only be produced upon the addition of a specific amount of a specific calcium salt as defined in the present invention to the nonaqueous electrolyte used.

Relationship between the amount of calcium salt added and the storage stability

Example 1 was repeated except that the amount of Ca(CF$_3$SO$_3$)$_2$ was changed diversely, to prepare nonaqueous electrolyte batteries.

The batteries thus prepared were charged at a charge current of 200 mA to a voltage of 4.1 V, then stored at 60° C. for 2 months and discharged at 200 mA to 2.75 V to give the discharge capacity after storage. The results are shown in FIG. 2.

FIG. 2 is a graph showing the relationship between the amount of Ca(CF$_3$SO$_3$)$_2$ added to the nonaqueous electrolyte and the discharge capacity after storage in the charged state, with the ordinate representing the discharge capacity (mAh) after storage and the abscissa the amount (mole/liter) of Ca(CF$_3$SO$_3$)$_2$ added. FIG. 2 also shows the discharge capacity after storage of the battery A1 [amount of Ca(CF$_3$SO$_3$)$_2$ added: 3×10$^3$ mole/liter ] and that of the comparison battery B1 [no addition of Ca(CF$_3$SO$_3$)$_2$].

From FIG. 2 it is understood that the amount of Ca(CF$_3$SO$_3$)$_2$ added of 3×10$^{-4}$ to 3×10$^{-2}$ mole/liter produced a significant effect as compared with no addition of said salt, and that, in particular, with the amount added being in a range of 1.5×10$^{-3}$ to 6×10$^{-3}$ mole/liter the discharge capacity after storage minimally decreases from that before storage. Similar tests were conducted with the above exemplified calcium salt derivatives and showed that in these cases also the addition in a range of 1.5×10$^{-3}$ to 6×10$^{-3}$ mole/liter is desirable.

Although the above description has been made on application of the present invention to cylindrical nonaqueous electrolyte batteries, the present invention is applicable to nonaqueous electrolyte batteries of any shape, such as flat or square, with no specific restrictions. The present invention is also applicable to both primary and secondary batteries.

Obviously, numerous modifications and variations of the invention are possible in light of the above teachings. It is therefore to be understood that within the scope of the appended claims, the invention may be practiced otherwise than as specifically described herein.

What is claimed is:

1. A nonaqueous electrolyte battery comprising a positive electrode, a negative electrode with lithium as an active material, a nonaqueous electrolyte comprising a solute and a solvent, and a separator, said nonaqueous electrolyte further comprising 3×10$^{-4}$ to 3×10$^{-2}$ mole/liter of at least one calcium salt selected from the group consisting of Ca(CF$_3$SO$_3$)$_2$, Ca(BF$_4$)$_2$, Ca(PF$_6$)$_2$, Ca{N(CF$_3$SO$_2$)$_2$}$_2$, Ca(ClO$_4$)$_2$, Ca(AlCl$_4$)$_2$, Ca(CF$_3$COO)$_2$, Ca{P(CF$_3$SO$_2$}$_2$, CaMe$^1$(CF$_3$SO$_3$)$_3$, CaMe$^1$(BF$_4$)$_3$, CaMe$^1$(PF$_6$)$_3$, CaMe$^1${N(CF$_3$SO$_2$)$_2$}$_3$, CaMe$^1$(ClO$_4$)$_3$, CaMe$^1$(AlCl$_4$)$_3$, CaMe$^1$(CF$_3$COO)$_3$, CaMe$^1${P(CF$_3$SO$_2$)$_2$}$_3$, CaMe$^1$Me$^2$(CF$_3$SO$_3$)$_5$, CaMe$^1$Me$^2$(BF$_4$)$_5$, CaMe$^1$Me$^2$(PF$_6$)$_5$, CaMe$^1$Me$^2${N(CF$_3$SO$_2$)$_2$}$_5$, CaMe$^1$Me$^2$(ClO$_4$)$_5$, CaMe$^1$Me$^2$(AlCl$_4$)$_5$, CaMe$^1$Me$^2$(CF$_3$COO)$_5$, CaMe$^1$Me$^2${P(CF$_3$SO$_2$)$_2$}$_5$ and derivatives of the foregoing, wherein Me$^1$ represents Li, Na, K, Rb, Cs or Fr and Me$^2$ represents Be, Mg, Sr, Ba or Ra.

2. The nonaqueous electrolyte battery according to claim 1, wherein said nonaqueous electrolyte comprises 1.5×10$^{-3}$ to 6×10$^{-3}$ mole/liter of at least one calcium salt selected from said group.

3. The nonaqueous electrolyte battery according to claim 1, wherein said nonaqueous electrolyte further comprises 10 to 1,000 ml of N-methyl-2-pyrrolidone per mole of said calcium salt.

4. The nonaqueous electrolyte battery according to claim 1, wherein said solute is LiPF$_6$, LiCF$_3$SO$_3$, LiClO$_4$, LiBF$_4$, LiN(CF$_3$SO$_2$)$_2$ or LiAsF$_6$.

5. The nonaqueous electrolyte battery according to claim 1, wherein said solvent is ethylene carbonate, propylene carbonate, butylene carbonate, vinylene carbonate, 1,2-dimethoxyethane, dimethyl carbonate, diethyl carbonate, ethylmethyl carbonate, tetrahydrofuran, 1,3-dioxolane or mixtures of the foregoing.

6. The nonaqueous electrolyte battery according to claim 1, wherein said positive electrode comprises as an active material a metal oxide or metal sulfide containing at least one transition metal selected from the group consisting of manganese, cobalt, nickel, vanadium, iron and niobium.

7. The nonaqueous electrolyte battery according to claim 1, wherein said negative electrode with lithium as the active material comprises as the negative electrode active material a lithium alloy such as an Li—Al alloy, Li—Sn alloy or Li—Pb alloy; a metal oxide such as Fe$_2$O$_3$, Nb$_2$O$_3$ or WO$_3$; or a carbon material such as graphite or coke.

8. The nonaqueous electrolyte battery according to claim 1, wherein said derivatives are Ca(CCl$_3$SO$_3$)$_2$, Ca(CH$_3$SO$_3$)$_2$, Ca{N(CCl$_3$SO$_2$)$_2$}$_2$ and Ca{N(CH$_3$SO$_2$)$_2$}$_2$, Ca(BCl$_4$)$_2$, Ca(PCl$_6$)$_2$, Ca(CCl$_3$COO)$_2$ and Ca(CH$_3$COO)$_2$.

* * * * *